No. 742,543. PATENTED OCT. 27, 1903.
T. WILSON & V. H. SLINACK.
WELSBACH OR OTHER BURNER.
APPLICATION FILED SEPT. 16, 1902.
NO MODEL.
2 SHEETS—SHEET 1.
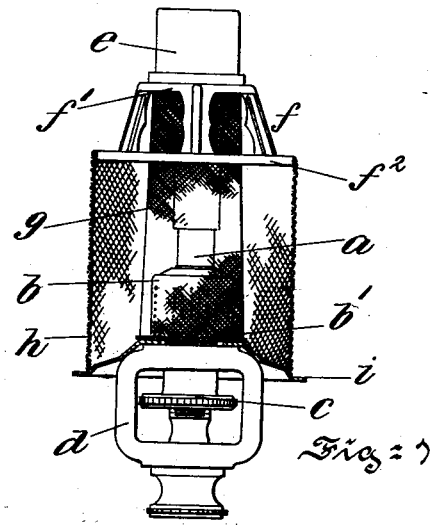
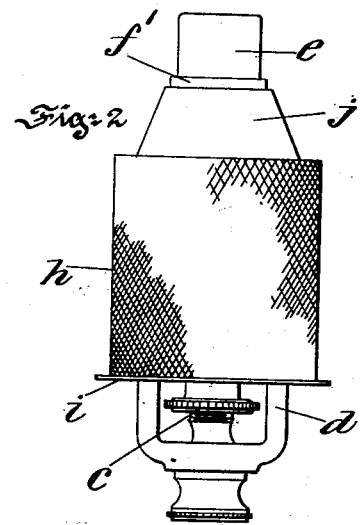
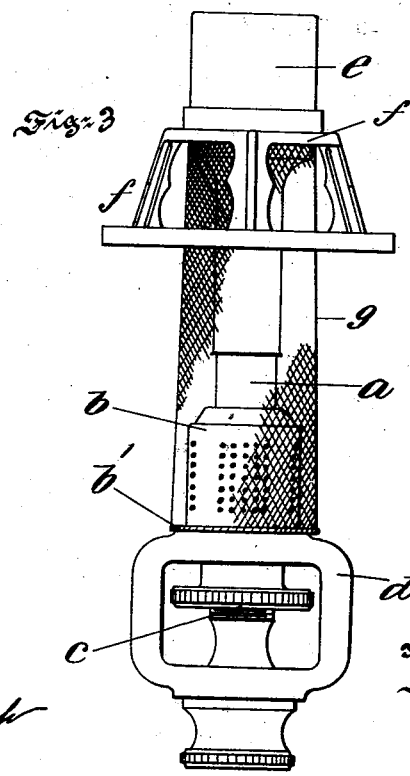

No. 742,543. PATENTED OCT. 27, 1903.
T. WILSON & V. H. SLINACK.
WELSBACH OR OTHER BURNER.
APPLICATION FILED SEPT. 16, 1902.
NO MODEL. 2 SHEETS—SHEET 2.
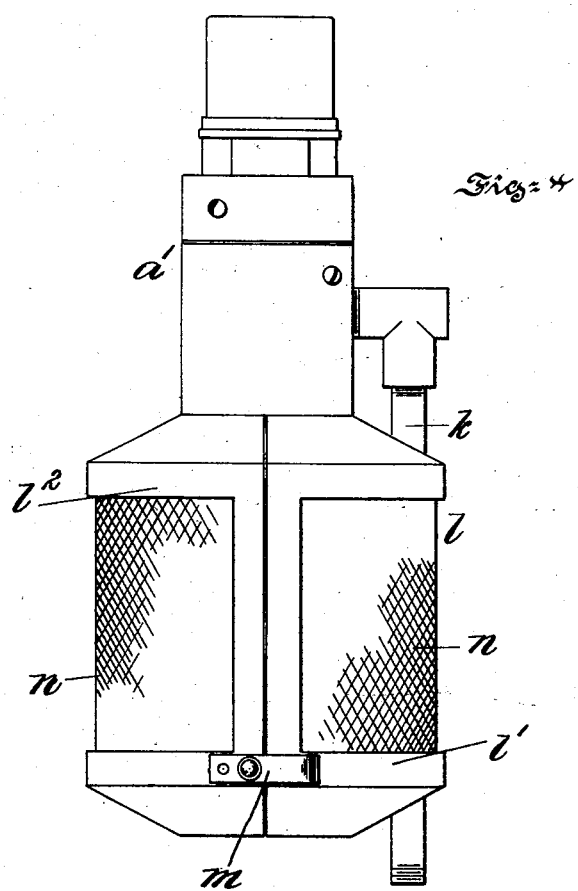
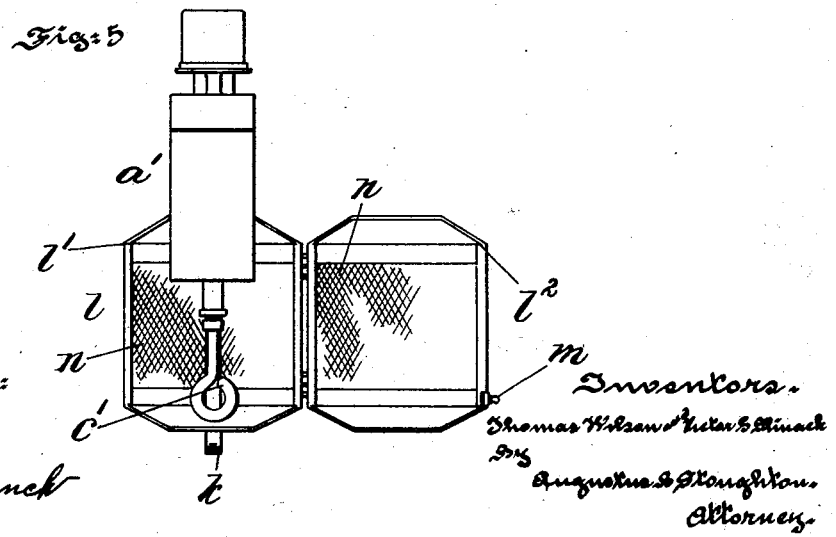

No. 742,543.

Patented October 27, 1903.

UNITED STATES PATENT OFFICE.

THOMAS WILSON AND VICTOR H. SLINACK, OF PHILADELPHIA, PENNSYLVANIA, ASSIGNORS TO THE PENNSYLVANIA GLOBE GAS LIGHT COMPANY, OF PHILADELPHIA, PENNSYLVANIA, A CORPORATION.

WELSBACH OR OTHER BURNER.

SPECIFICATION forming part of Letters Patent No. 742,543, dated October 27, 1903.

Application filed September 16, 1902. Serial No. 123,621. (No model.)

*To all whom it may concern:*

Be it known that we, THOMAS WILSON and VICTOR H. SLINACK, citizens of the United States, residing at Philadelphia, in the county of Philadelphia and State of Pennsylvania, have invented certain new and useful Improvements in Welsbach or other Burners, of which the following is a specification.

The object of the invention is to fill a recognized want and to provide means to exclude bugs and insects from Welsbach and other street-lights. Such bugs and insects have heretofore found a ready passage through the air-openings of the Bunsen tube, and their charred remains have clogged the burner-cap and also left dull spots on the incandescent or mantle, whereby great deterioration in the light has resulted.

The invention consists in the improvements hereinafter described and claimed.

The nature, characteristic features, and scope of the invention will be more fully understood from the following description, taken in connection with the accompanying drawings, forming a part hereof, wherein—

Figure 1 is a sectional elevational view of a Welsbach street-light having means for excluding bugs and insects in accordance with this our present invention. Fig. 2 is an elevational view of a modification. Fig. 3 is a similar view of a modification. Fig. 4 is an elevational view showing the invention applied to a vapor-burner; and Fig. 5 is a view of the same, on a smaller scale, showing the guard or casing opened.

Referring to Fig. 1, $a$ represents a Bunsen tube equipped with an air-shutter $b$, needle-valve $c$, yoke-support $d$, and burner-head $e$, all of the usual and well-known construction. There is also a gallery $f$. $g$ represents an insect-guard consisting of a reticulated member of substantially cylindrical or tubular form, so as to entirely surround the Bunsen tube. Such guard or casing may be made of screen-wire or its equivalent. The bottom of the guard rests on the flange or collar $b'$ of the air-shutter, and the top is closed by the upper ring $f'$ of the gallery. $h$ is an outer insect guard or casing, which is preferably carried by the gallery-ring $f^2$, said ring also acting to close the space at the top between the two insect-guards. The bottom of the outer casing or guard rests upon a sheet-metal washer or base-support $i$, interposed between the bottom of the air-shutter and the yoke $d$.

In Fig. 2 use is made simply of the outer guard $h$, which is closed at its top by the cone or gallery $j$ and at its bottom by the sheet-metal washer or collar $i$.

In Fig. 3 the outer guard or casing $h$ is dispensed with; but otherwise the construction is the same as that illustrated in Fig. 1.

Referring to Figs. 4 and 5, $a'$ represents a well-known construction of vapor-burner equipped with a needle-valve $c'$ and with an oil-supply pipe $k$. The bottom of the burner-casing is inclosed by a reticulated casing or insect-guard $l$, which is made to open, so that access can be had to the needle-valve $c'$. Such casing or guard may consist of the stationary part or frame $l'$, suitably attached to the burner-casing, and a hinged part or door-frame $l^2$, a suitable catch $m$ being provided to maintain said door closed. $n$ represents screen-wire or its equivalent fitted in the partible frame or casing and through which air is supplied to the burner. The stationary part $l'$ is perforated at top and bottom to permit the passage of the oil-supply pipe $k$.

In Figs. 1 to 3 the insect-guards may be removed by simply removing the galleries, the guards being detachable therewith.

It will be obvious to those skilled in the art to which the invention relates that modifications may be made in details without departing from the spirit and scope of same. Hence we do not limit ourselves to the precise construction and arrangement of parts hereinbefore described, and illustrated in the accompanying drawings; but Having described the nature and objects of the invention, what is claimed as new, and desired to secure by Letters Patent, is—

In combination, a Bunsen burner, a gallery mounted in detachable relation therewith, and a pair of screens carried by said gallery, whereof one extends from the inner or top ring of the gallery to below the air-inlet openings of the Bunsen, and whereof the other depends from the outer or bottom ring of the gallery, substantially as described.

In testimony whereof we have hereunto signed our names in the presence of two subscribing witnesses.

THOMAS WILSON.
VICTOR H. SLINACK.

Witnesses:
W. J. JACKSON,
FRANK E. FRENCH.